US010233372B2

(12) United States Patent
Ramasamy et al.

(10) Patent No.: US 10,233,372 B2
(45) Date of Patent: Mar. 19, 2019

(54) LOSS CIRCULATION MATERIAL FOR SEEPAGE TO MODERATE LOSS CONTROL

(71) Applicant: Saudi Arabian Oil Company, Dhahran (SA)

(72) Inventors: Jothibasu Ramasamy, Dhahran (SA); Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/658,899

(22) Filed: Jul. 25, 2017

(65) Prior Publication Data
US 2018/0171201 A1 Jun. 21, 2018

Related U.S. Application Data

(60) Provisional application No. 62/436,639, filed on Dec. 20, 2016.

(51) Int. Cl.
E21B 33/138 (2006.01)
C09K 8/035 (2006.01)
C09K 8/14 (2006.01)
C09K 8/16 (2006.01)
C09K 8/10 (2006.01)
E21B 21/00 (2006.01)
C09K 8/508 (2006.01)

(52) U.S. Cl.
CPC .............. C09K 8/035 (2013.01); C09K 8/10 (2013.01); C09K 8/145 (2013.01); C09K 8/16 (2013.01); C09K 8/5083 (2013.01); E21B 21/003 (2013.01); E21B 33/138 (2013.01); C09K 2208/08 (2013.01)

(58) Field of Classification Search
None
See application file for complete search history.

(56) References Cited

U.S. PATENT DOCUMENTS 2,156,220 A 6/1937 Dunn
2,747,670 A 11/1954 King et al.
3,303,882 A 2/1967 Browning
(Continued)

FOREIGN PATENT DOCUMENTS

EP 1396573 A1 3/2004
WO 2016076745 A1 5/2016

OTHER PUBLICATIONS

International Search Report and Written Opinion for International Application No. PCT/US2017/067467; International Filing Date Dec. 20, 2017; dated Mar. 12, 2018 (pp. 1-14).

Primary Examiner — Andrew Sue-Ako
(74) Attorney, Agent, or Firm — Bracewell LLP; Constance G. Rhebergen; Brian H. Tompkins

(57) ABSTRACT

A two-component lost circulation material (LCM) is provided. The two-component LCM includes a polymer component and a sodium hydroxide component. The polymer component may include may include a drilling fluid, a fibrous material such as polypropylene fibers, and an acrylic polymer, such as a 30% acrylic polymer solution. The sodium hydroxide component may include water and sodium hydroxide. The sodium hydroxide component is introduced to contact the polymer component to form the two-component LCM. Methods of lost circulation control and manufacture of a two-component LCM are also provided.

5 Claims, 1 Drawing Sheet

(56) References Cited

U.S. PATENT DOCUMENTS

| | | | |
|---|---|---|---|
| 3,482,634 A | | 12/1969 | Cox |
| 3,530,937 A | | 9/1970 | Bernard |
| 3,837,400 A | | 9/1974 | Martin |
| 5,975,220 A | * | 11/1999 | Mueller .................. C09K 8/08 175/65 |
| 6,889,766 B2 | | 5/2005 | Creel et al. |
| 6,902,002 B1 | | 6/2005 | Chatterji et al. |
| 7,013,973 B2 | | 3/2006 | Danican et al. |
| 7,111,683 B2 | | 9/2006 | Nelson et al. |
| 8,271,246 B2 | | 9/2012 | Leonard et al. |
| 8,383,558 B2 | | 2/2013 | Reddy et al. |
| 2006/0122071 A1 | * | 6/2006 | Reddy .................. C09K 8/5045 507/219 |
| 2010/0243657 A1 | | 9/2010 | Johnson et al. |
| 2014/0353043 A1 | | 12/2014 | Amanullah et al. |
| 2016/0257869 A1 | | 9/2016 | Kulkarni et al. |
| 2017/0058178 A1 | | 3/2017 | Smith |
| 2017/0058179 A1 | | 3/2017 | Stoian et al. |
| 2018/0010030 A1 | * | 1/2018 | Ramasamy ............ C09K 8/035 |

* cited by examiner

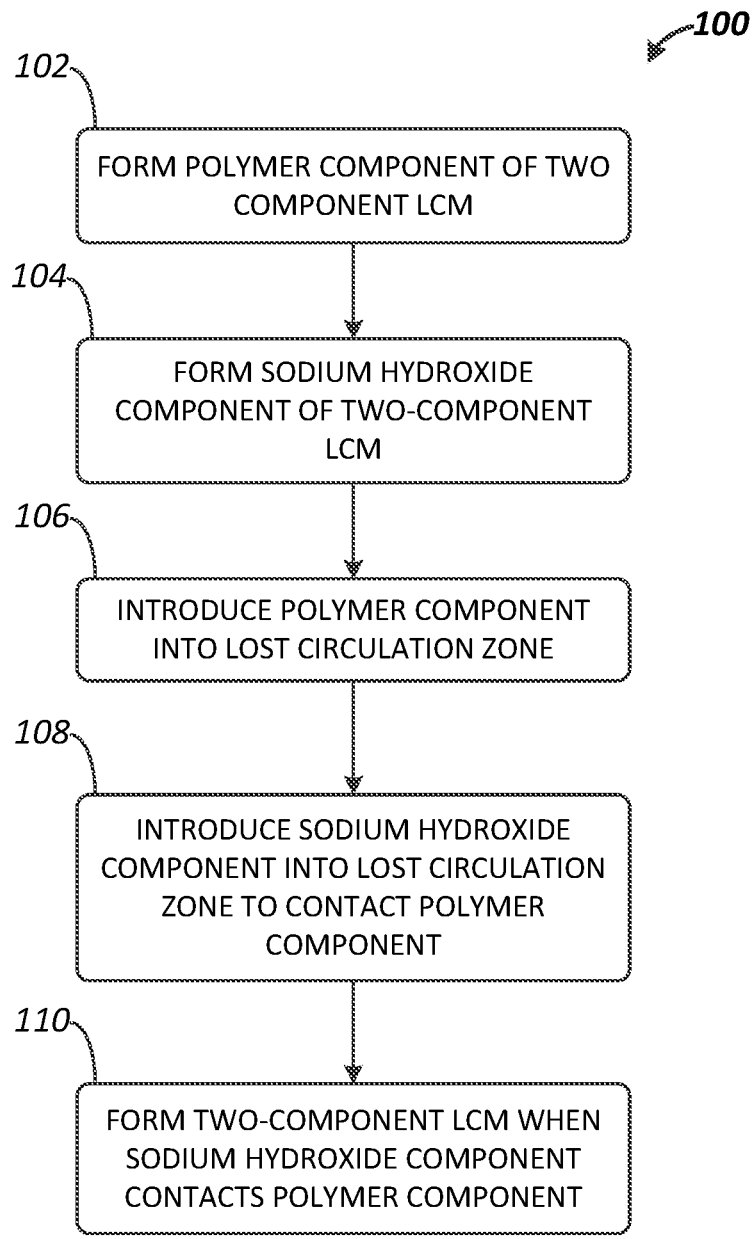

LOSS CIRCULATION MATERIAL FOR SEEPAGE TO MODERATE LOSS CONTROL

CROSS-REFERENCE TO RELATED APPLICATIONS

This application claims priority from U.S. Provisional Application No. 62/436,639 filed Dec. 20, 2016, and titled "LOSS CIRCULATION MATERIAL FOR SEEPAGE TO MODERATE LOSS CONTROL." For purposes of United States patent practice, this application incorporates the contents of the Provisional Application by reference in its entirety.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (or drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost, such as seepage type, moderate type, severe type, and total loss. The extent of the fluid loss and the ability to control the lost circulation with an LCM depends on the type of formation in which the lost circulation occurs. Seepage type and moderate type lost circulation may occur in high permeable formations, extremely high permeable formations (referred to as "super-K" formations), fissured and fractured formations. In addition to the natural causes of lost circulation, subsurface formations having a narrow mud weight window, such as weak and unconsolidated formations, depleted formations, and high pressure zone formations, may also cause moderate to severe lost circulation due to the creation of induced fractures in the near wellbore formation. Such lost circulation may occur when the mud weight used for well control and borehole stability exceeds the fracture gradient of the formation.

SUMMARY

Lost circulation materials (LCMs) are used to mitigate the lost circulation by blocking the path of the drilling mud into the formation. The type of LCM used in a lost circulation situation depends on the extent of lost circulation and the type of formation. Lost circulation materials may be classified into different categories, such as fibrous materials, flaky materials, granular materials, gel type materials, cross-linking polymers, and loss control slurries. Such materials are used either alone or in combination to control loss of circulation. The costs incurred in lost circulation situations may be due to lost time, losses of drilling fluids, and losses of production. Existing LCMs may perform poorly in mitigation and prevention of moderate and seepage type lost circulation, and may not be suitable for controlling severe loss of circulation. Moreover, in addition to the effectiveness of the LCM in sealing the loss zone, the success of an LCM treatment is also depends on how quickly an LCM is prepared and applied to the loss zone before excessive lost circulation occurs.

In one embodiment, a lost circulation material (LCM) composition is provided. The composition includes a first component having a drilling fluid, polypropylene fibers, and an acrylic polymer, and a second component having sodium hydroxide. In some embodiments, the drilling fluid is selected from the group consisting of a bentonite mud, a potassium chloride (KCl) polymer mud, or a weighted barite mud. In some embodiments, the LCM composition consists essentially of the first component and the second component. In some embodiments, the second component further includes water. In some embodiments, the second component consists of sodium hydroxide and water.

In another embodiment, a method to control lost circulation in a lost circulation zone in a wellbore is provided. The method includes introducing a first component into the wellbore such that the first component contacts the lost circulation zone. The first component includes a drilling fluid, polypropylene fibers, and an acrylic polymer. The method further includes introducing a second component into the wellbore, such that the second component contacts the first component in the lost circulation zone and forms a lost circulation material (LCM) from the reaction of the first component with the second component and reduces a rate of lost circulation in the lost circulation zone. The second component includes sodium hydroxide. In some embodiments, the drilling fluid is a first drilling fluid, so that introducing the first component into the wellbore such that the first component contacts the lost circulation zone includes introducing altered second drilling fluid having the first component into the wellbore, such that the second drilling fluid contacts the lost circulation zone. In some embodiments, the first drilling fluid and the second drilling fluid have the same composition. In some embodiments, introducing the second component into the wellbore such that the second component contacts the first component in the lost circulation zone includes inserting coiled tubing into the wellbore and introducing the second component via coiled tubing via the wellbore. In some embodiments, the drilling fluid is selected from the group consisting of a bentonite mud, a potassium chloride (KCl) polymer mud, or a weighted barite mud. In some embodiments, the second component further includes water.

In another embodiment, a method of forming a lost control material (LCM) composition is provided. The method includes mixing a drilling fluid, polypropylene fibers, and an acrylic polymer solution to form a first mixture, and mixing water and sodium hydroxide to form a second mixture. In some embodiments, the LCM composition is formed by contacting the first mixture with the second mixture. In some embodiments, contacting the first mixture with the second mixture occurs in a wellbore. In some embodiments, contacting the first mixture with the second mixture occurs in a lost circulation zone of the wellbore. In some embodiments, mixing a drilling fluid, a fibrous material, and an acrylic polymer solution to form the first mixture includes adding the drilling fluid to form the first mixture, adding the polypropylene to first mixture, and adding the acrylic polymer solution to the first mixture. In some embodiments, the drilling fluid is selected from the group consisting of a bentonite mud, a potassium chloride (KCl) polymer mud, or a weighted barite mud. In some embodiments, the acrylic polymer solution includes water and at least 30% by weight acrylic polymer. In some embodiments, the volumetric ratio of acrylic polymer solution to drilling fluid is in the range of 1:1.5 to about 1:15.

BRIEF DESCRIPTION OF THE DRAWINGS

FIG. 1 is a block diagram of a process for manufacturing and using a two-component LCM in accordance with an example embodiment of the disclosure.

DETAILED DESCRIPTION

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the volume of the drilling fluid that returns to the surface is less than the volume of the drilling fluid pumped into the wellbore, and it is this reduction or absence of returning drilling fluid that is referred to as lost circulation.

Embodiments of the disclosure include a two-component LCM to mitigate or prevent lost circulation in a well, as well as to provide seepage control and minimize or prevent fluid loss. The two-component LCM includes a polymer component and a sodium hydroxide (also referred to as "caustic soda") component. The polymer component includes a drilling fluid, a fibrous material, and an acrylic polymer solution. As used herein, the term "acrylic polymer solution" refers to a solution of acrylic polymer and water. In some embodiments, the polymer component includes a drilling mud, polypropylene as the fibrous material, and the acrylic polymer solution. In some embodiments, the drilling mud may be a weighted barite mud, a gel polymer mud, or a potassium chloride (KCl) mud. In some embodiments, the polymer component of the two-component LCM includes polypropylene fibers in the range of about 2 grams (g) to about 6 g, and a 30% acrylic polymer solution (that is, an aqueous solution having 30% by weight acrylic polymer) in the range of about 20 milliliters (ml) to 60 ml. In some embodiments, the sodium hydroxide component includes water and sodium hydroxide. In some embodiments, the sodium hydroxide component may include at least 20% by weight sodium hydroxide of the total weight of the sodium hydroxide component.

In some embodiments, the acrylic polymer solution of the polymer component is a 30% acrylic polymer solution, such as XUR 201300673-39-B obtained from Dow Chemical of Midland, Mich., USA. In some embodiments, the acrylic polymer solution may include sodium polycarboxylate in the range of about 29% to about 31% and water in the range of about 69% to about 71%. In some embodiments, the two-component LCM may include polypropylene as the fibrous material. In some embodiments, the polypropylene may be a polypropylene homopolymer. In some embodiments, the polypropylene fibers may have a melting point of greater than 165° C. and a specific gravity of 0.91 kilograms/liter (kg/L). In some embodiments, the polypropylene fibers are formed from isotactic polypropylene. In some embodiments, the polypropylene may be polypropylene fiber obtained from Belgian Fibers Manufacturing SA of Mouscron, Belgium.

In some embodiments, the two-component LCM may be formed by introducing (for example, pumping) the polymer component downhole, such as in a fluid pill (that is, a small amount (for example, less than 200 barrels (bbl) of the prepared polymer component), followed by introducing (for example, pumping) the sodium hydroxide component downhole that the sodium hydroxide component comes into contact with the polymer component and forms the two-component LCM. In some embodiments, the polymer component may be added directly to a drilling fluid (that is, a drilling fluid used during drilling operations that may be the same or different than the drilling fluid of the polymer component of the two-component LCM) to create an altered drilling fluid having the polymer component of the two-component LCM. After addition of the polymer component of the two-component LCM to a drilling fluid, the altered drilling fluid may be circulated at a pump rate effective to position the altered drilling fluid into contact with a lost circulation zone in a wellbore. In some embodiments, the sodium hydroxide component may be introduced to the polymer component downhole via coil tubing. As the sodium hydroxide component comes into contact with the polymer component, the two-component LCM forms and alters the lost circulation zone (for example, by entering and blocking porous and permeable paths, cracks, and fractures in a formation in the lost circulation zone, such as forming a plug in a fracture).

Advantageously, the two-component LCM described in the disclosure may use conventional drilling fluid as part of the polymer component, thus reducing the time for preparation of the LCM when a loss zone is encountered. Moreover, the two-component LCM using a conventional drilling fluid as part of the polymer component additionally provides instant in-situ interaction and formation with an improved ease of delivery to a lost circulation zone, reducing NPT and fluid losses due to lost circulation.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a two-component LCM were prepared and evaluated against commercially available LCMs. A two-component LCM having a polymer component (referred to as "Component I") and a sodium hydroxide component (referred to as "Component II") were prepared according to the techniques described in the disclosure. As described infra, each example two-component LCM was prepared using a different drilling mud.

A first example of a two-component LCM was prepared using a gel polymer mud. The composition of the gel polymer mud is shown in Table 1, with the amount of each with the amount of each constituent expressed in cubic centimeters (cc) or grams (g):

TABLE 1

Composition of Bentonite Mud
Bentonite Mud

| Component | Composition |
|---|---|
| Water (cc) | 340.67 |
| Bentonite (g) | 25 |
| Caustic Soda (g) | 0.25 |
| Soda Ash (g) | 0.25 |

The composition of the first example of the two-component LCM is shown in Table 2, with the amount of each constituent expressed in milliliters (ml) or grams (g), and, where indicated, as the weight percentage of the total weight (w/w %):

TABLE 2

Composition of First Example Two-Component LCM

| Component I | |
|---|---|
| Bentonite Mud (ml) | 200 |
| Polypropylene (g) | 4 |
| Acrylic polymer, 30% (ml) | 40 |
| Component II | |
| Water (ml) | 6 (80 w/w %) |
| Caustic soda (g) | 1.5 (20 w/w %) |

A second example of a two-component LCM was prepared using a KCl-polymer mud. The KCl polymer mud includes a polyanionic cellulose filtrate control additive, PAC LV manufactured by BRI-CHEM Supply Corporation of Denver, Colo., USA. The composition of the KCl-polymer mud is shown in Table 3, with the amount of each with the amount of each constituent expressed in cubic centimeters (cc) or grams (g):

TABLE 3

Composition of KCl-polymer Mud
KCl-polymer mud

| Component | Composition |
|---|---|
| Water (cc) | 310.28 |
| Caustic Soda (g) | 0.25 |
| Soda Ash (g) | 0.25 |
| Bentonite (g) | 5.00 |
| PAC LV (g) | 3.00 |
| XC Polymer (xanthan gum) (g) | 1.00 |
| KCl (g) | 42.31 |
| CaCO₃ (g), fine particles (in the range of 9 micron to 11 microns) | 46.80 |

The composition of the second example of the two-component LCM is shown in Table 4, with the amount of each constituent expressed in milliliters (ml) or grams (g), and, where indicated, as the weight percentage of the total weight (w/w %):

TABLE 4

Composition of Second Example Two-Component LCM

| Component I | |
|---|---|
| KCl-polymer (ml) | 200 |
| Polypropylene (g) | 4 |
| Acrylic polymer, 30% (ml) | 40 |
| Component II | |
| Water (ml) | 6 (80 w/w %) |
| Caustic soda (g) | 1.5 (20 w/w %) |

A third example of a two-component LCM was prepared using a weighted barite mud. The composition of the weighted barite mud is shown in Table 5, with the amount of each with the amount of each constituent expressed in cubic centimeters (cc) or grams (g):

TABLE 5

Composition of Weighted Barite Mud
Weighted Barite Mud

| Component | Composition |
|---|---|
| Water (ml) | 350 |
| XC (g) | 1 |
| Potato starch (g) | 6 |
| Barite (g) | 200 |
| Caustic Soda (g) | 0.25 |

The composition of the third example of the two-component LCM is shown in Table 6, with the amount of each constituent expressed in milliliters (ml) or grams (g), and, where indicated, as the weight percentage of the total weight (w/w %):

TABLE 6

Composition of Third Example Two-Component LCM

| Component I | |
|---|---|
| Weighted Barite Mud (ml) | 200 |
| Polypropylene (g) | 4 |
| Acrylic polymer, 30% (ml) | 40 |
| Component II | |
| Water (ml) | 6 (80 w/w %) |
| Caustic soda (g) | 1.5 (20 w/w %) |

Component I and Component II of each example two-component LCMs were prepared separately. Component I of the two-component LCM was prepared by adding 4 g of polypropylene fiber to 200 ml of the drilling mud and mixing in a mixer manufactured by Hamilton Beach Brands, Inc., of Glen Allen, Va., USA, at a relatively slow shear rate (for example, 11,500 revolutions per minute (rpm)). Next, 40 ml of a 30% acrylic polymer solution was added to the mixture and allowed to mix at a relatively slow shear rate for about 3 minutes (min). Component II of each example two-component LCM was prepared by adding 1.5 g of caustic soda to 6 ml of water and slowly mixing to ensure sufficient mixing of the two ingredients.

A plugging efficiency test was performed on the example two-component LCMs using a 2 millimeter (mm) slotted metal disc and a Permeability Plugging Tester (also referred to as a "PPT" or "Pore Plugging Test" apparatus) manufactured by OFI Testing Equipment, Inc., of Houston, Tex., USA. The conventional cell of the Permeability Plugging Tester used in the plugging efficiency test may be operated up to 2,000 pounds-per-square inch differential (psid) and 500° F. The 2 mm slotted metal disc was used as the filter medium of the Permeability Plugging Tester in the plugging efficiency test. A first plugging efficiency test was performed at conditions of room temperature and about 1000 psi differential pressure, and a second plugging efficiency was performed at conditions of about 250° F. and about 1000 psi differential pressure. The two-component LCM was tested by placing the prepared Component I inside the PPT cell, adding the separately prepared Component II to the PPT cell, and then mixing to form the example two-component LCMs.

Each two-component LCM was tested using the Permeability Plugging Tester apparatus and the following plugging efficiency test procedure:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Placing the prepared Component I inside the test cell, add the separately prepared Component II to the test cell, and mix to form the two-component LCM;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;
19. Apply the required back pressure to the top of the cell, open the top valve, and pump the hydraulic hand pump to reestablish the testing pressure;
20. To determine the spurt volume, collect the fluid from the back pressure collector in a measuring cylinder and record the amount, ensuring that all the fluid has been expelled;
21. Collect the fluid periodically over a 30 minute time period and check the back pressure gauge to ensure that the testing pressure remains below the pressure threshold (about 3000 psi) of the built-in safety disc of the Permeability Plugging Tester apparatus and avoid expulsion of hot hydraulic oil;
22. Record the spurt loss, total leak off, and PPT values over the 30 minute time period.

Table 7 shows the results of the plugging efficiency tests for the example two-component LCMs, with the spurt loss, fluid loss, and PPT value measured in cubic centimeters (cc):

TABLE 7

Plugging Efficiency Test Results for Two-Component LCM

| Test No. | Mud type | Slot size (mm) | Test Temperature (° F.) | Test Pressure Differential (psi) | Spurt Loss (cc) | Fluid Loss (cc) | PPT Value (cc) |
|---|---|---|---|---|---|---|---|
| 1 | Two-component LCM using bentonite mud | 2 | Room Temperature | 1000 | 0 | 0 | 0 |
| 2 | Two-component LCM using bentonite mud | 2 | 250 | 1000 | 2 | 0 | 2 |
| 3 | Two-component LCM using KCl polymer mud | 2 | Room Temperature | 1000 | 0 | 0 | 0 |
| 4 | Two-component LCM using KCl polymer mud | 2 | 250 | 1000 | 2 | 0 | 2 |
| 5 | Two-component LCM using weighted barite mud | 2 | Room Temperature | 1000 | 0 | 0 | 0 |
| 6 | Two-component LCM using weighted barite mud | 2 | 250 | 1000 | 3 | 0 | 3 |

As shown in Table 2, the in-situ generated two-component LCM examples exhibited zero spurt loss and zero fluid loss for the entire test period for the plugging efficiency tests carried out at room temperature and 1000 psi differential pressure. For the tests performed at 250° F. and 1000 psi differential pressure, the in-situ generated two-component LCM examples exhibited negligible spurt loss and zero fluid loss. The results of the plugging efficiency tests shown in Table 7 demonstrate the suitably of the two-component LCM for controlling losses in lost circulation zones.

Two-Component LCM Manufacture and Use

In some embodiments, a two-component LCM may include a polymer component and a sodium hydroxide component. The polymer component may include an acrylic polymer solution. In some embodiments, the acrylic polymer solution is a 30% acrylic polymer solution. In some embodiments, the acrylic polymer is obtained from Dow Chemical of Midland, Mich., USA. As will be appreciated, the acrylic polymer may be stable in water (for example, not water absorbing or swellable) but, when converted to acrylate on contact with the sodium hydroxide component, may absorb large amounts of water and swell much larger than its original size. The acrylic polymer may be, for example, a polyacrylic acid that is converted to sodium polyacrylate on contact with the sodium hydroxide component.

In some embodiments, the polymer component includes a drilling fluid, a fibrous material, and a 30% acrylic polymer solution. In some embodiments, the polymer component of the two-component LCM includes a drilling mud, polypropylene fibers as the fibrous material, and an acrylic polymer (which, in some embodiments, may be a 30% acrylic polymer solution). In some embodiments, the drilling mud may be a gel polymer mud, a KCl polymer mud, or a weighted barite mud. In other embodiments, other suitable drilling fluids may be used in the polymer component.

In some embodiments, the polypropylene may be a polypropylene homopolymer. In some embodiments, the polypropylene may be obtained from Belgian Fibers Manufacturing SA of Mouscron, Belgium. As will be appreciated, the propylene is a thermoplastic polymer lighter than water and having resistance to acids and alkalis. In some embodiments, the polypropylene may be fibers having a flash ignition of about 255° C., a melting point greater than about 165° C., and a specific gravity of about 0.91.

In some embodiments, the polymer component includes drilling fluid in the range of 100 ml to 300 ml, polypropylene fibers in the range of about 2 g to about 6 g, and a 30% acrylic polymer solution in the range of about 20 ml to about 60 ml. In some embodiments, the volumetric ratio of acrylic polymer solution to drilling fluid is in the range of about 1:1.5 to about 1:15. In some embodiments, the polymer component includes at least 200 ml of drilling mud, at least 4 g of polypropylene, and at least 40 ml of a 30% acrylic polymer solution.

In some embodiments, the sodium hydroxide component includes sodium hydroxide and water. In some embodiments, the sodium hydroxide component includes 6 ml of water and 1.5 g of sodium hydroxide. In some embodiments, the sodium hydroxide component is at least 20 w/w % sodium hydroxide. In some embodiments, the sodium hydroxide component may include 80 w/w % water and 20 w/w % sodium hydroxide. In other embodiments, the sodium hydroxide component may include 25 w/w % sodium hydroxide.

In some embodiments, the two-component LCM may be formed by introducing (for example, via pumping) the polymer component downhole, such as in a fluid pill, followed by introducing (for example, via pumping) the sodium hydroxide component downhole that the sodium hydroxide component comes into contact with the polymer component and forms the two-component LCM. In some embodiments, the polymer component may be added directly to a drilling fluid used during drilling operations, such as a drilling mud, to create an altered drilling fluid having the polymer component of the two-component LCM. For example, in some embodiments, the polymer component may be added to (for example, blended with) an oil-based drilling mud or a water-based drilling mud. The drilling fluid used during drilling operations may have the same composition or a different composition than the drilling fluid used in the polymer component of the two-component LCM. In some embodiments, the polymer component of the two-component LCM may be added at the mud pit of a mud system.

After addition of the polymer component of the two-component LCM to a drilling fluid, the altered drilling fluid may be circulated at a pump rate effective to position the altered drilling fluid into contact with a lost circulation zone in a wellbore. After introduction of the polymer component of the two-component LCM, the sodium hydroxide component may be introduced to the polymer component via coil tubing. As the sodium hydroxide component comes into contact with the polymer component, the two-component LCM is formed and alters the lost circulation zone (for example, by entering and blocking porous and permeable paths, cracks, and fractures in a formation in the lost circulation zone, such as forming a plug in a fracture). Alternatively, in some embodiments, the two-component LCM may be formed on the surface before being introduced downhole, such as by mixing the polymer component and the sodium hydroxide component at the surface.

FIG. 1 depicts a process 100 for manufacturing and using a two-component LCM having a polymer component and a sodium hydroxide component in accordance with an example embodiment of the disclosure. In some embodiments, the polymer component may be formed (block 102) by mixing a drilling fluid (for example, a drilling mud), a fibrous material (for example, polypropylene fibers), and an acrylic polymer (such as a 30% acrylic polymer solution) in a mixer for a time period (for example, about 3 minutes). In some embodiments, for example, the drilling fluid may be a gel polymer mud, a KCl polymer mud, or a weighted barite mud. As noted in the disclosure, the use of a conventional drilling fluid (such as the example gel polymer mud, KCl polymer mud, or weighted barite mud) may provide for faster preparation and subsequent application of the two-component LCM when a loss zone is encountered. For example, in some embodiments, the drilling fluid used in the polymer component may have the same composition as and may be obtained from the drilling fluid used during drilling operations at a wellsite where the two-component LCM is prepared. In other embodiments, the drilling fluid used in the polymer component may have a different composition than the drilling fluid used during drilling operations at the wellsite where the two-component LCM is prepared. As shown in FIG. 1, the sodium hydroxide component may be formed (block 104) by mixing sodium hydroxide and water in a mixer to ensure sufficient mixing the components.

Next, the polymer component may be introduced into a lost circulation zone (block 106). For example, in some embodiments the polymer component may be added to a drilling fluid and pumped downhole as an altered drilling fluid. Next, the sodium hydroxide component may be introduced into the lost circulation zone to contact the polymer component (block 108). For example, the sodium hydroxide component may be introduced by coiled tubing (also referred to as a "coiled tubing string"). As the sodium hydroxide component comes into contact with the polymer component, the two-component LCM is formed (block 110). In some embodiments, for example, the two-component LCM may be formed or described as forming a pill.

In other embodiments, the two-component LCM and one or more additional LCMs may be added to a drilling fluid, such as a drilling mud, to create an altered drilling fluid having the LCMs. For example, in some embodiments, the polymer component of the two-component LCM and one or more additional LCMs may be added to an oil-based drilling mud or a water-based drilling mud.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to control lost circulation in a lost circulation zone in a wellbore, comprising:
    introducing a first component into the wellbore such that the first component contacts the lost circulation zone, wherein the first component comprises:
    a drilling fluid, wherein the drilling fluid is selected from the group consisting of a bentonite mud, a potassium chloride (KCl) polymer mud, or a weighted barite mud, wherein the bentonite mud comprises water, bentonite, caustic soda, and soda ash;
    the potassium chloride (KCl) polymer mud comprises water, caustic soda, soda ash, bentonite, a polyanionic cellulose additive, and xanthan gum; and
    the barite mud comprises water, xanthan gum, potato starch, barite, and caustic soda;
    polypropylene fibers; and
    an acrylic polymer;
    introducing a second component into the wellbore, such that the second component contacts the first component in the lost circulation zone and forms a lost circulation material (LCM) from the reaction of the first component with the second component and reduces a rate of lost circulation in the lost circulation zone,
    wherein the second component comprises sodium hydroxide.

2. The method of claim 1, wherein the drilling fluid is a first drilling fluid, wherein introducing the first component into the wellbore such that the first component contacts the lost circulation zone comprises introducing an altered second drilling fluid having the first component into the wellbore, such that the altered second drilling fluid contacts the lost circulation zone, wherein the altered second drilling fluid comprises the first component and a second drilling fluid.

3. The method of claim 2, wherein the first drilling fluid and the second drilling fluid have the same composition.

4. The method of claim 1, wherein introducing the second component into the wellbore such that the second component contacts the first component in the lost circulation zone comprises:
    inserting coiled tubing into the wellbore; and
    introducing the second component via coiled tubing via the wellbore.

5. The method of claim 1, wherein the second component further comprises water.

* * * * *